V. J. TICHOTA.
DRAFT EQUALIZER.
APPLICATION FILED MAR. 7, 1913.
1,093,087.
Patented Apr. 14, 1914.
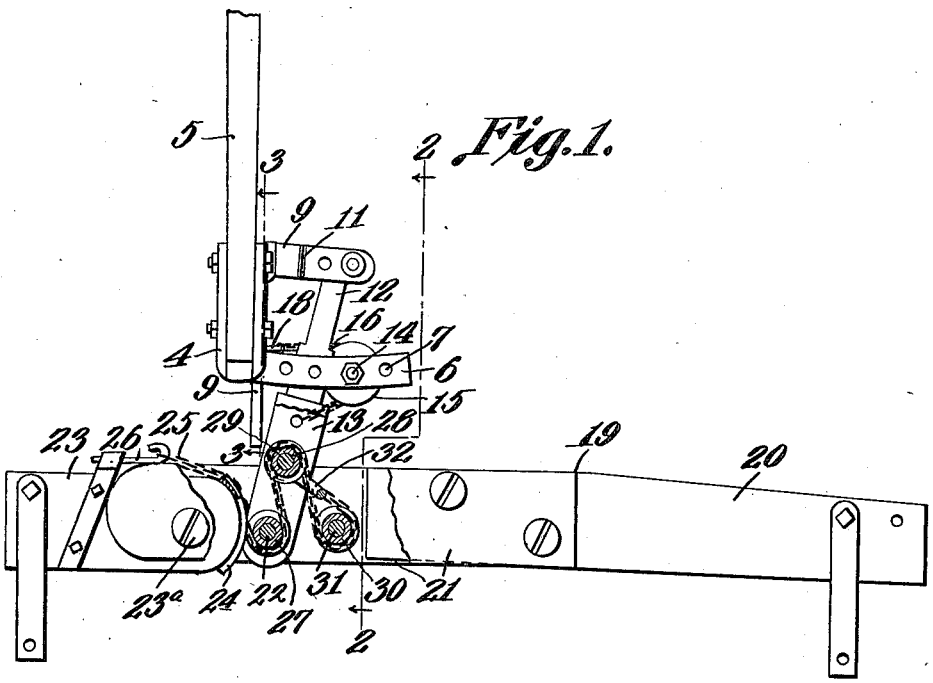
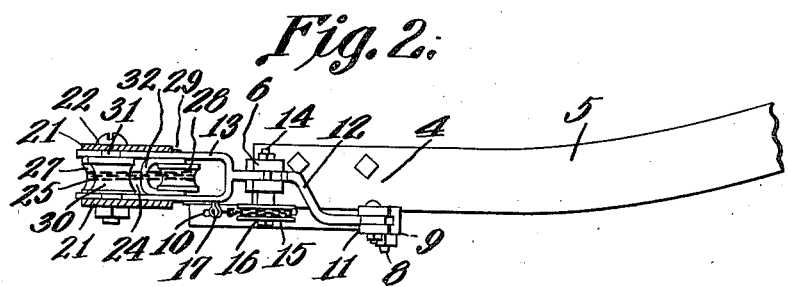
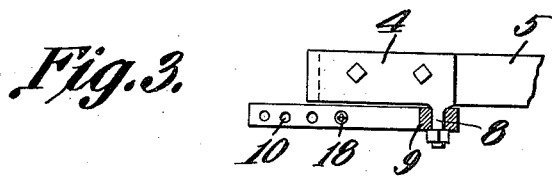
Witnesses
Vencel J. Tichota,
Inventor
by C. A. Snow & Co.
Attorneys

UNITED STATES PATENT OFFICE.

VENCEL J. TICHOTA, OF DODGE, NEBRASKA.

DRAFT-EQUALIZER.

1,093,087.

Specification of Letters Patent.

Patented Apr. 14, 1914.

Application filed March 7, 1913. Serial No. 752,707.

*To all whom it may concern:*

Be it known that I, VENCEL J. TICHOTA, a citizen of the United States, residing at Dodge, in the county of Dodge and State of Nebraska, have invented a new and useful Draft-Equalizer, of which the following is a specification.

The present invention appertains to draft equalizers, and is particularly an improvement over the draft equalizer disclosed in my copending application, Serial No. 734,423, filed November 30, 1912.

It is the object of the present invention to provide a new and useful device of the character indicated, which shall be applicable to plow beams, or other parts of riding or walking earth tilling implements or the like, the device being adapted for the attachment of a plurality of draft animals and being so operable as to proportionately distribute the draft between the various animals.

The present invention also has for its object to provide a draft equalizer for the attachment of a plurality of draft animals, and which will be operable to produce a resultant draft extending approximately in the line of draft of the plow, or the like, the device being so operable that any unevenness or inequality of the draft produced by the various draft animals will not cause the resultant draft to deviate appreciably from the normal line of draft, so as not to produce any undesirable or undue side draft.

A further object of the present invention is to provide a device of the character indicated embodying a long and a short lever to which the draft animals are attachable, in connection with novel means operably connecting the levers and operably connecting the levers with the plow beam, or the like, so that the resultant draft created by animals will be approximately in alinement with the line of draft of the plow, notwithstanding the diversity of movements of the draft animals within practical limits.

With the foregoing and other objects in view, which will appear as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a plan view of the appliance as applied to a plow beam. Fig. 2 is a sectional view taken on the line 2—2 of Fig. 1. Fig. 3 is a fragmental detail.

In carrying out the invention, reference being had to the drawing, there is provided a casting or frame embodying a U-shaped body 4 which is adapted to straddle the forward end of the plow beam 5, or any other suitable part of a walking or riding soil tilling implement or the like, according to the use to which the device is put. It is to be understood, however, that this body 4 may be of various constructions according to circumstances, and as will be apparent to the artisan or mechanic. The body 4 is provided at its forward end or bend with a pair of laterally projecting guides or arms 6 which are preferably curved slightly. The guides 6 are each provided with a series of apertures 7 and the respective end of the body 4 is provided with a depending pintle 8, through which pintle the elbow of an L-shaped or bell-crank lever 9 is fulcrumed. The long arm of the lever 9 projects forwardly and is provided with a series of apertures 10 therein, while the other arm is bifurcated or forked as designated by the numeral 11. A draft bar 12 is adjustably pivoted between the branches of the forked arm 11 and passes between the guides 6 so that the draft bar 12 may swing between the guides, the forward end of the draft bar 12 being forked as designated by the numeral 13.

A bolt or other pivot member 14 is passed through one of the apertures 7 of the guides 6, thus to limit the movement of the draft bar 12 between the body 4 and the bolt 14, and on the lower end of the bolt 14, there is journaled a pulley, sheave, or rotary guide 15. A chain or other flexible element 16 is trained around the pulley 15 and is attached at one end by means of an eye 17 to the lower branch of the fork 13 of the draft bar 12, a bolt 18 being attached to the other end of the chain 16 and being engaged through one of the apertures 10 of the long arm of the lever 9.

It is evident that the bolt 14 may be adjusted along the guides 6 that the draft bar 12 may be pivoted to the fork 11 at various points, and that the bolt 18 may be adjusted along the long arm of the lever 9, so that the proper operation of the relative parts will ensue, according to the various circumstances.

The long lever has been designated generally by the numeral 19, and embodies a timber or bar 20 and a pair of plates or strips 21 bolted to its upper and lower faces so as to project from its inner end. The plates 21 straddle the fork 13, and are fulcrumed or pivoted thereto by means of a bolt or pivot member 22 which passes through the plates 21 and ends of the fork 13. The free ends of the plates 21 project beyond the fork 13 toward the other side.

The short lever has been designated generally by the numeral 23, the same being constructed of wood or any other suitable material and having its inner end disposed between the extremities of the plates 21, the bolt or other pivot member 23ª being passed through the plates 21 and the lever 23 to fulcrum the lever adjoining its inner end within the plates 21. In this manner, the short lever is fulcrumed adjoining its inner end to the short arm of the long lever, or to the inner end of the long lever.

The respective sets of draft animals are attachable to the outer or free ends of the levers 19 and 23 in any suitable manner, so that one set of animals, or those attached to the short lever 23, may travel in a path relatively close to the path of the plow, and so that the other set of draft animals, or those attached to the long lever, may travel in a path at a distance somewhat more remote from the path of the plow.

In order to equalize or distribute the draft necessary to move the plow, between the two sets of draft animals in the most effective or proportionate manner, a flexible connection of novel form has been provided between the levers 19 and 23 and the draft member 12. To this end, the inner end of the short lever 23 is rounded and has secured thereto, a curved or arcuate channel member or guide 24, and a chain or flexible member 25 is attached to the rear of the lever 23 by means of a bolt 26, and is passed around the guide or segment 24 and around a pulley or sheave 27 rotatably mounted on the bolt or pivot member 22 between the branches of the fork 13. The pulley 27 is arranged relatively close to the guide or segment 24 so that the chain will properly run over the pulley 27 and the segment 24. The chain 25 extends from the pulley 27 around the pulley 28 mounted on a bolt or pivot member 29 passing through the branches of the fork 13 in rear of the pulley 27, and from thence, passes around the pulley 30 journaled on a bolt or pivot member 31 passing through the plates 21 adjoining the inner end of the bar 20. The pulley 28 is disposed between the branches of the fork 13, while the pulley 30 is disposed between the plates 21. The other end of the chain 25 is attached to a clevis 32 having its ends or its extremities engaging the bolt 29 between the ends of the pulley 28 and the branches of the fork 13, so that it will be evident that the ends of the chain or flexible member 25 are connected to the draft member 12 and the short lever 23, the intermediate portions of the chain being trained over the respective guides 30, 28, 27, and 24.

As the result of the particular connection between the long and the short levers and the draft member 12, the long and short levers will be constrained to move through relatively small and large arcs when one or the other is moved or swung forwardly or is given a proportionately greater draft or strain. In other words, when the long lever is swung forwardly, the short lever is swung rearwardly relative to the long lever, and conversely, when the short lever is swung forwardly, the long lever is swung rearwardly, but through a smaller angle.

In use, as above indicated, the respective draft animals are attached to the free ends of the long and short levers, this being accomplished in any well known manner, and it being understood that one or more draft animals may be attached to either lever. It will be apparent that the respective draft animals will move in paths relatively close and remote from the path of the plow or other structure, thus permitting the respective draft animals to travel on the tilled and untilled soil, or the respective sides of the line of the furrow being plowed. As the draft animals move forward, the draft will be ultimately transmitted to the plow beam through the medium of the structure above described which will equalize the draft proportionately between the respective draft animals and which will provide a resultant draft extending in a line approximately in alinement with the draft line of the plow or plow beam. Thus, should the draft created by the animals attached to the long lever be proportionately greater than the draft transmitted to the short lever, the long lever will be swung forwardly, and as a consequence, the short lever will be swung rearwardly through a greater angle, which is necessary due to the inequality of the lengths of the levers, so as to properly proportion the draft between the respective draft animals.

The difficulty arising from the use of a long and a short lever, as herein disclosed, is due to the fact that the draft transmitted to the long lever will tend to swing the plow beam toward the other side or to produce a draft toward the side to which the short lever projects. With the present device, however, when the long lever is swung forwardly, the short lever is swung rearwardly at a greater angle, and as a result, the draft member 12 will be given a swinging tendency toward the side to which the short lever projects. The movement of the draft bar 12 will cause the chain 16 to be drawn around the pulley 15 and the lever 9 will be swung so that the change in the positions of the long and short levers which would tend to shift the resultant line of draft, will be overcome by the connection between the draft bar 12 and the frame or body of the device. In this manner, the draft bar 12 in being pivoted to one arm of the lever 9 and the flexible member 15 connecting the other arm of the lever 9 and the draft bar 12 will tend to maintain the resultant draft on the same line or in approximate alinement with the draft line of the plow.

The salient features or advantages of the present invention can best be pointed out by illustration. Let it be supposed that the short lever 23 is rigid with the long lever 20, in the manner of an ordinary evener bar, it will then be apparent that approximately three draft animals should be attached to the short lever 23 while but a single draft animal is attached to the long lever 20. However, with the arrangement as illustrated and described, it will be observed that the short lever 23 moves through an arch proportionately greater than if it were rigid with the long lever 20, and as a consequence, the number of draft animals attached to the short lever 23 may be proportionately less. Thus, it is only necessary to have two, or even one draft animal attached to the short lever while a single animal is attached to the long lever 20. This permits the several draft animals to be suitably spaced relative to each other, which could not be as efficiently attained with the ordinary evener bar. Another feature or advantage resides in the fact that the draft member 12 is automatically adjustable in order to bring the fulcrum 22 of the long lever 20 into the line of draft. Let it be supposed that the line of draft extends along the plow beam 5, then the forward or free end of the draft member 12 will be swung to the left, as seen in Fig. 1, to bring the member 22 into line with the plow beam 5, so that the draft may be properly transmitted to the plow beam. Supposing that the line of draft is slightly to the right of the plow beam, then the forward end of the draft member 12 would swing to the right, it being observed that the lever 9, chain 16, and pulley 15 will permit the draft member 12 to so adjust itself. It will also be evident that the draft member is freely movable within the guides 6 under ordinary conditions, but should the draft animals be turned to one side for turning the plow around, the draft member 12 will either strike the member 14 or the member 4, in order that the plow beam may be readily turned.

The other advantages of the present device will be apparent from the foregoing taken in connection with the drawing, and it has been found in practice that the mechanism disclosed herein carries out the objects aimed at in a satisfactory manner.

What is claimed is:—

1. In a draft equalizer, a frame, a lever fulcrumed thereto, a draft member connected to the lever, and a flexible member connecting the lever and draft member and guided by the frame.

2. In a draft equalizer, a frame, a bell crank lever fulcrumed thereto, a draft member pivoted to one arm of the said lever, a guide carried by the frame, and a flexible member connecting the draft member and the other arm of the said lever and trained around the guide.

3. In a draft equalizer, a frame including a pair of guides at its forward end, a bell crank lever fulcrumed to the rear end of the frame, a draft member passing through the guides and pivoted to one arm of the said lever, a pivot member passing through the guides, a rotary guide mounted on the pivot member, and a flexible member connecting the draft member and the other arm of the bell crank lever and trained over the rotary guide.

4. In a draft equalizer, a frame embodying a U-shaped body to straddle the end of a plow beam and having a pair of guides projecting laterally from its bend, a bell crank lever fulcrumed to one end of the body, a draft bar passing through the guides and pivoted to one arm of the bell crank lever, a pivot member passing through the guides, a rotary guide mounted on the pivot member, and a flexible member connecting the draft member and the other arm of the bell crank lever and trained over the rotary guide.

5. In a draft equalizer, a frame, a lever fulcrumed thereto, a draft member pivoted to the lever, a flexible member connecting the said lever and draft member and guided by the frame, a long lever pivoted to the draft member, a short lever pivoted to the long lever, and a flexible draft connection between the long and short levers and the draft member, whereby the long and short levers are moved through relatively small and large arcs as the draft transmitted to one lever is proportionately greater than that transmitted to the other.

6. In a device of the character described, a draft member, long and short levers carried thereby, guides carried by the draft member and long lever, and a flexible member attached to the short lever, trained around the said guides and attached to the draft member.

7. In a draft equalizer, a draft member, long and short levers carried thereby, guides carried by the draft member and long lever, a segment carried by the short lever, and a flexible member connecting the short lever and draft member and trained around the segment and guides.

8. In a draft equalizer, a draft member, a long lever fulcrumed to the draft member, a short member fulcrumed to the long lever, a segment secured to the inner end of the short lever, a pair of guides carried by the draft member, a guide carried by the long lever, and a flexible member connecting the short lever and draft member and trained around the segment and said guides.

9. In a draft equalizer, a draft member, a long lever fulcrumed thereto, a short lever fulcrumed to the long lever, a rotary guide mounted at the fulcrum of the long lever, a segment secured to the inner end of the short lever adjoining the said guides, a rotary guide carried by the draft member, a rotary guide carried by the long lever adjoining the aforesaid guide, and a flexible member attached to the short lever, trained around the segment and the first mentioned, second mentioned, and third mentioned guides, respectively and attached to the draft member.

10. In a draft equalizer, a draft bar having its forward end provided with a fork, a long lever embodying a pair of plates straddling the fork, a fulcrum member passing through the plates and fork, a short lever fulcrumed between the said plates, a rotary guide mounted on the fulcrum member, a segment secured to the inner end of the short lever adjoining the said guide, a rotary guide journaled between the branches of the fork in rear of the aforesaid guide and a rotary guide journaled between said plates, and a flexible member attached to the short arm, trained over the segment and the first mentioned, second mentioned, and third mentioned guides, respectively, and attached to the draft member.

In testimony that I claim the foregoing as my own, I have hereto affixed my signature in the presence of two witnesses.

VENCEL J. TICHOTA.

Witnesses:
HERMAN HOLSTEN,
E. H. HOLSTEN.

---

Copies of this patent may be obtained for five cents each, by addressing the "Commissioner of Patents. Washington, D. C."